US011520216B2

(12) United States Patent
Cheng

(10) Patent No.: US 11,520,216 B2
(45) Date of Patent: Dec. 6, 2022

(54) PROJECT WITH IMAGE CORRECTION SYSTEM

(71) Applicant: Aladdin X INC., Hyogo (JP)

(72) Inventor: Tao Cheng, Tokyo (JP)

(73) Assignee: Aladdin X INC.

( * ) Notice: Subject to any disclaimer, the term of this patent is extended or adjusted under 35 U.S.C. 154(b) by 13 days.

(21) Appl. No.: 16/607,613

(22) PCT Filed: Sep. 20, 2018

(86) PCT No.: PCT/JP2018/034832
§ 371 (c)(1),
(2) Date: Oct. 23, 2019

(87) PCT Pub. No.: WO2019/059283
PCT Pub. Date: Mar. 28, 2019

(65) Prior Publication Data
US 2020/0081329 A1    Mar. 12, 2020

(30) Foreign Application Priority Data

Sep. 22, 2017 (WO) .................. PCT/JP2017/034343

(51) Int. Cl.
*G03B 21/14*        (2006.01)
*G03B 21/54*        (2006.01)
(Continued)

(52) U.S. Cl.
CPC ........... *G03B 21/145* (2013.01); *G03B 21/54* (2013.01); *H04N 5/74* (2013.01); *H04N 9/31* (2013.01)

(58) Field of Classification Search
CPC ...... G03B 21/145; G03B 21/54; G03B 21/28; G03B 21/22; G03B 21/147; G03B 21/20;
(Continued)

(56) References Cited

U.S. PATENT DOCUMENTS 6,795,158 B1 * 9/2004 Reynolds ............... G03B 21/32
352/41
9,602,787 B2 * 3/2017 Blaser, Jr. .............. G03B 29/00
(Continued)

FOREIGN PATENT DOCUMENTS

CN       1822661 A      8/2006
CN     202647453 U      1/2013
(Continued)

OTHER PUBLICATIONS

Office Action issued by Taiwan Patent Office for corresponding Taiwan Patent Application No. 107132846 and English Summary Translation of Examination Opinions dated Feb. 13, 2020 (9 pages).
(Continued)

*Primary Examiner* — Magda Cruz
(74) *Attorney, Agent, or Firm* — St Onge Steward Johnston and Reens LLC

(57) ABSTRACT

A projector system includes a connector attachable to a lighting wiring base mounted on a ceiling surface of a room, a housing hanging from the connector, a communicator accommodated in the housing to obtain content to be projected onto a wall surface of the room, a projection unit accommodated in the housing to emit emission light to project a picture including the content onto the wall surface, a brightness sensor to sense a brightness of the room, and a corrector to control the emission light to correct an effect of a state of the wall surface on the projected picture in accordance with the brightness of the room.

15 Claims, 19 Drawing Sheets

(51) Int. Cl.
*H04N 5/74* (2006.01)
*H04N 9/31* (2006.01)

(58) Field of Classification Search
CPC ........ G03B 21/14; G03B 27/68; G03B 21/00;
H04N 5/74; H04N 9/31; H04N 9/3185;
G08B 21/18; F21V 33/00; G06F 3/01;
G09G 3/22; G02B 27/00; F21S 2/00
See application file for complete search history.

(56) References Cited

U.S. PATENT DOCUMENTS

| | | | |
|---|---|---|---|
| 10,345,686 B2* | 7/2019 | Muramatsu | G01S 17/08 |
| 10,613,423 B2* | 4/2020 | Cho | G03B 21/2066 |
| 2006/0082740 A1* | 4/2006 | Radhouane | H04N 5/74 |
| | | | 353/122 |
| 2006/0181686 A1* | 8/2006 | Matsuda | H04N 9/3194 |
| | | | 353/69 |
| 2010/0289664 A1* | 11/2010 | Mizushima | H05B 47/155 |
| | | | 340/691.6 |
| 2012/0113399 A1* | 5/2012 | Yeom | H04N 9/3194 |
| | | | 353/121 |
| 2013/0194554 A1* | 8/2013 | Aruga | G03B 21/005 |
| | | | 353/121 |
| 2014/0198949 A1* | 7/2014 | Garlington | G03B 21/208 |
| | | | 382/103 |
| 2015/0042964 A1 | 2/2015 | Furui | |
| 2015/0160539 A1* | 6/2015 | Bassi | G03B 21/147 |
| | | | 353/69 |
| 2016/0025327 A1* | 1/2016 | Abe | G03B 29/00 |
| | | | 348/744 |
| 2016/0232706 A1* | 8/2016 | Herman | H04N 13/279 |
| 2016/0269702 A1* | 9/2016 | Konno | G03B 21/62 |
| 2017/0272716 A1* | 9/2017 | Nakagawa | H04N 9/3185 |
| 2017/0350566 A1* | 12/2017 | Ono | G03B 21/2033 |
| 2018/0156401 A1* | 6/2018 | Ono | G03B 21/2033 |
| 2018/0220112 A1* | 8/2018 | Miichi | H05B 47/00 |
| 2018/0306431 A1* | 10/2018 | Watanabe | H04N 9/3179 |
| 2018/0348617 A1* | 12/2018 | Watanabe | G06F 3/01 |

FOREIGN PATENT DOCUMENTS

| | | | |
|---|---|---|---|
| CN | 206398677 U | 8/2017 | |
| JP | 2003289485 A | 10/2003 | |
| JP | 2003289485 A | * 10/2003 | |
| JP | 2006154260 A | 6/2006 | |
| JP | 2008185757 A | 8/2008 | |
| JP | 2008244671 A | * 10/2008 | ............ G03B 21/00 |
| JP | 2008244671 A | 10/2008 | |
| JP | 2012028877 A | 2/2012 | |
| JP | 2012186118 A | 9/2012 | |
| JP | 2012231356 A | 11/2012 | |
| JP | 2015222344 A | 12/2015 | |
| JP | 2016133799 A | 7/2016 | |
| KR | 1020060042443 A | 5/2006 | |
| KR | 1020070042709 A | 4/2007 | |
| KR | 1020120050345 A | 5/2012 | |
| TW | 201344335 A | 11/2013 | |

OTHER PUBLICATIONS

Office Action from Korean Intellectual Property Office for Application No. 10-2019-7021984 dated Aug. 31, 2020 (English translation provided).

* cited by examiner

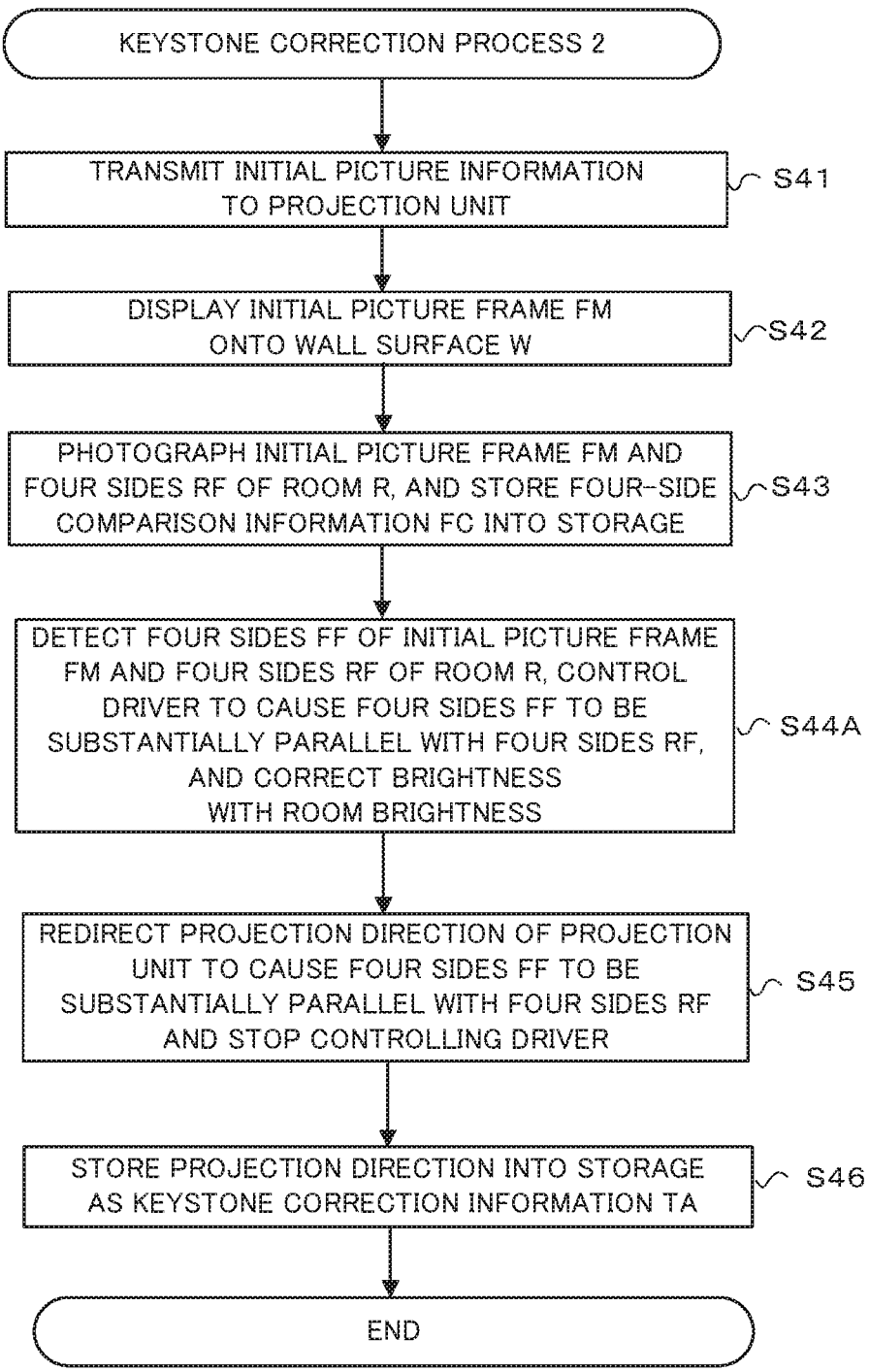

PROJECT WITH IMAGE CORRECTION SYSTEM

FIELD OF THE INVENTION

The present disclosure relates to a projector and a projector system mountable on the ceiling surface of a room.

BACKGROUND OF THE INVENTION

Projectors are increasingly used in ordinary households to view pictures or images. However, a projector is combined with a screen on which pictures or others may appear, and the projector and the screen are to be positioned with no obstacle between them appearing on the screen. The projector and the screen not in use can be obstructions and thus are usually housed. However, positioning the projector and the screen appropriately every time when using the projector can cause inconvenience to the user.

To address this issue, Patent Literature 1 describes a projector incorporating an illuminator and attachable to a lighting wiring base (JIS C 8310:2000 (Similar to Luminaire Supporting Couplers (British Standards: BS7001))) mounted on a ceiling such as a ceiling rose.

CITATION LIST

Patent Literature

Patent Literature 1: Unexamined Japanese Patent Application Kokai Publication No. 2008-185757

SUMMARY OF THE INVENTION

Technical Problem

The projector described in Patent Literature 1 is attached to a ceiling rose and cannot be an obstruction when not in use, and thus is neither housed nor is positioned for use. However, the projector either causes the inconvenience of setting a screen for every use of the projector or takes a space for the screen placed at all times. When the projector is used without a screen, pictures appearing on a wall or other surface instead of a screen can be affected by any irregularity or colors and patterns on the surface, and are difficult to view by the user.

One or more aspects of the present disclosure are directed to a projector and a projector system that can remain mounted at all times and project pictures easily viewable by a user on a projection surface with any surface irregularity or colors and patterns.

Solution to Problem

In response to the above issue, a projector system according to a first aspect of the present disclosure includes a connector attachable to a lighting wiring base mounted on a ceiling surface of a room, a housing hanging from the connector, a communicator accommodated in the housing to obtain content to be projected onto a wall surface of the room, a projection unit accommodated in the housing to emit emission light to project a picture including the content onto the wall surface, and a corrector to control the emission light to correct an effect of a state of the wall surface on the projected picture.

The projector system may further include an illuminator arranged in the housing or mounted external to the housing.

The corrector may control illumination light from the illuminator to smooth a color change in a boundary between the picture and the wall surface.

The corrector may obtain, through the communicator, a state of the wall surface obtained by photographing the wall surface, and correct an effect of the state of the wall surface on the projected picture.

The projector system may further include an imager. The imager may photograph the wall surface, and the corrector may correct the effect of the state of the wall surface on the projected picture based on the state of the wall surface obtained by photographing.

The corrector may perform keystone correction to cause the four sides of the content to be substantially parallel with the four corresponding sides of the room including the ceiling surface, the wall surface, and a floor surface of the room.

The imager may photograph four sides of the content projected on the wall surface, and four sides of the room including the ceiling surface, the wall surface, and the floor surface of the room, and the corrector may perform, based on a state of the content obtained by photographing, keystone correction to cause the four sides of the content to be substantially parallel with the four corresponding sides of the room including the ceiling surface, the wall surface, and the floor surface of the room.

The corrector may be connected through the communicator, and may be provided external to the housing.

The corrector may be accommodated in the housing.

A projector according to a second aspect of the present disclosure includes a connector attachable to a lighting wiring base mounted on a ceiling surface of a room, a housing hanging from the connector, a communicator accommodated in the housing to obtain content to be projected onto a wall surface of the room, and a projection unit accommodated in the housing to emit emission light to project a picture including the content onto the wall surface. The communicator communicates with an external device including a corrector and causes the corrector to control the emission light and correct an effect of a state of the wall surface on the projected picture.

Advantageous Effects of Invention

The projector and the projector system according to the aspects of the present disclosure can remain mounted at all times and project pictures easily viewable by a user on a projection surface with any irregularity or colors and patterns.

BRIEF DESCRIPTION OF THE DRAWINGS

FIG. 18 is a flowchart of a keystone correction process 2 according to the other embodiment;

DETAILED DESCRIPTION OF THE INVENTION

A projector and a projector system according to one or more embodiments of the present disclosure will now be described with reference to the accompanying drawings.

Figure 1:
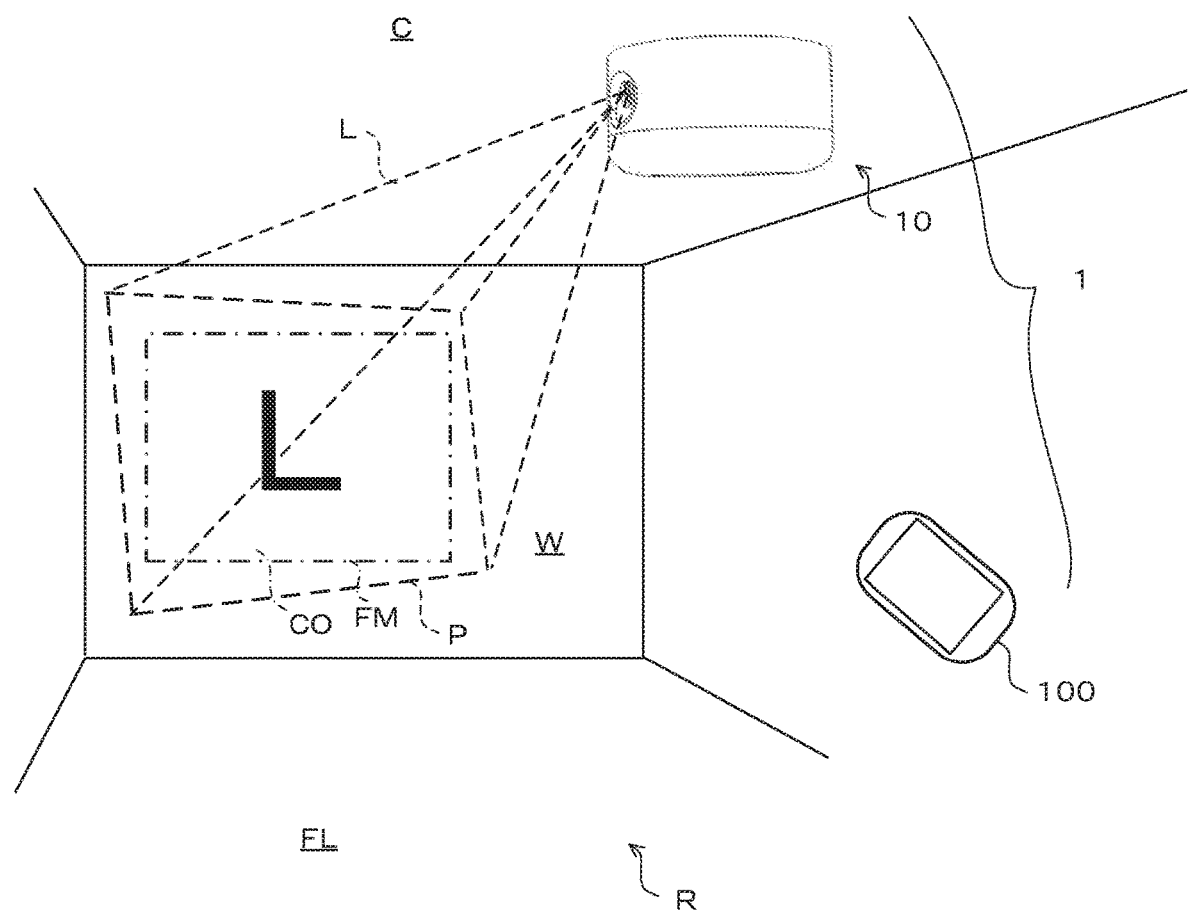
FIG. 1 is a schematic view of a projector system according to an embodiment of the present disclosure.

As shown in FIG. 1, a projector system 1 according to an embodiment of the present disclosure includes a digital light processing (DLP) projector 10 to be mounted on the ceiling of a room and a remote control (external device) 100 for the projector.

Structure of Projector 10

Figure 2:
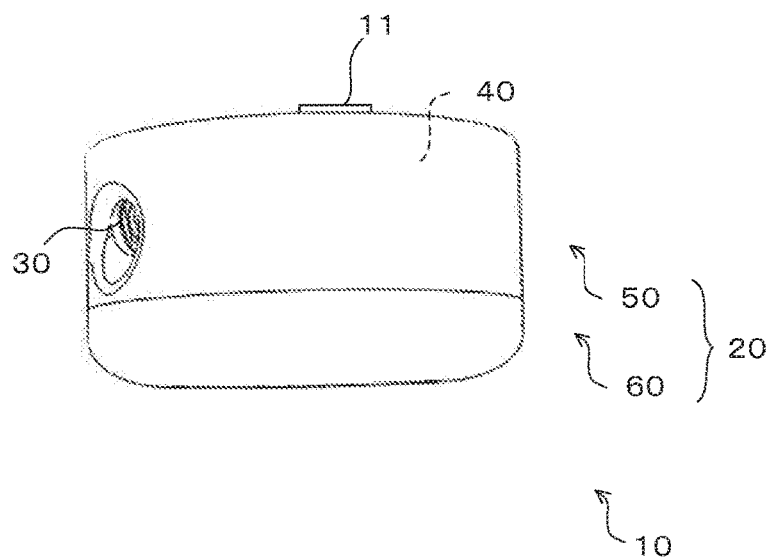
FIG. 2 is a perspective view of a projector according to the embodiment of the present disclosure.

As shown in FIG. 2, the projector 10 includes a connector 11, a housing 20, a projection unit 30, and a communicator 40. The housing 20 is substantially cylindrical, and has a substantially circular upper end and a substantially bowl-shaped lower end, and includes an upper part 50 and a lower part 60.

The connector (ceiling rose plug) 11 is located in the center of the upper surface of the housing 20 and is attached to a ceiling rose body (lighting wiring base) for a room R. The projector 10 is powered via the connector 11. The connector 11 and the ceiling rose body (JIS C 8310:2000) bear the weight of the projector 10.

Structure of Upper Part 50

Figure 3:
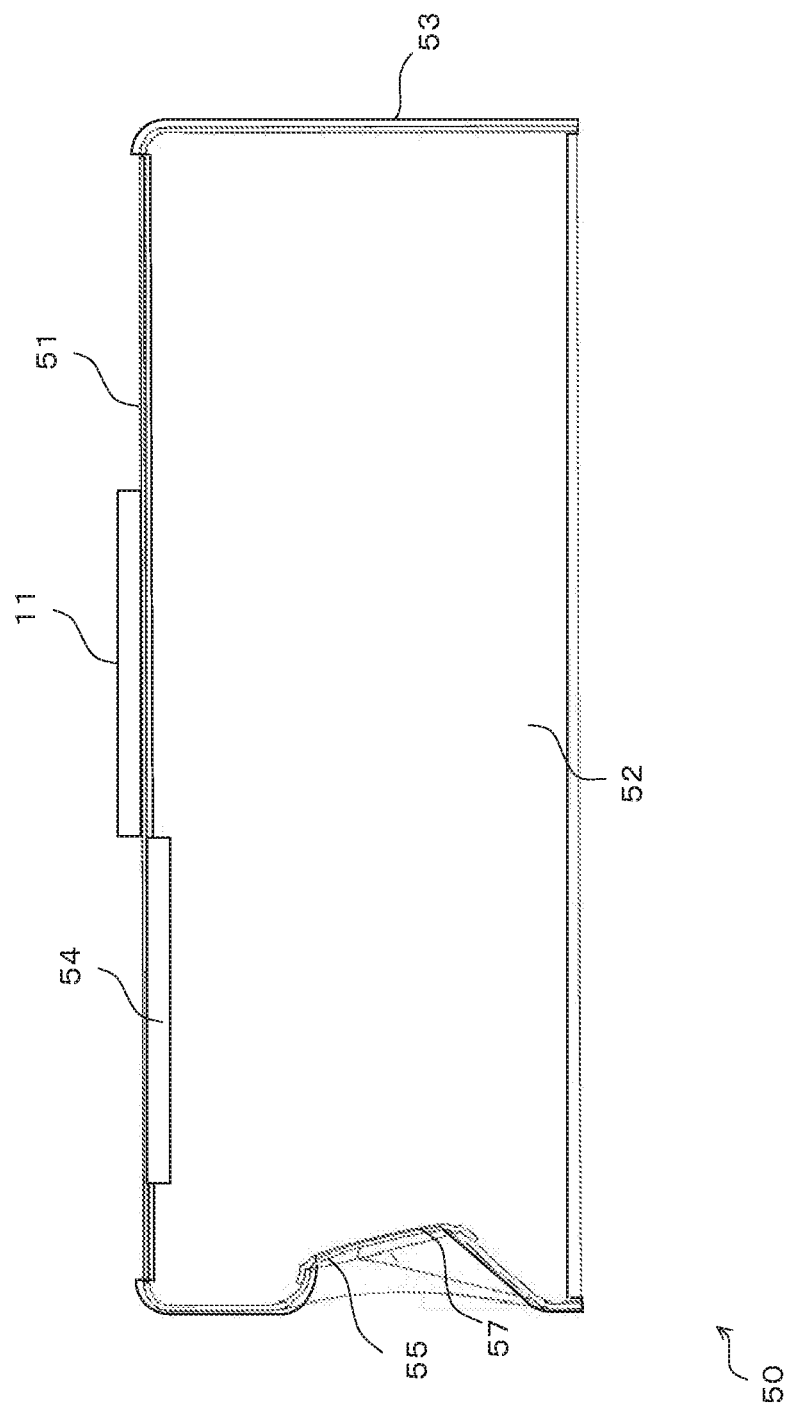
FIG. 3 is a cross-sectional side view of an upper part of the projector shown in FIG. 2 without showing the internal structure.

As shown in FIG. 3, the upper part 50 includes a top board 51, an upper housing 52, and a covering cloth 53. The top board 51 is formed from metal and is substantially disk-shaped and has the connector 11 in the center of the upper surface. The lower surface of the top board 51 includes a holding member 54 that holds a driver 32 for the projection unit 30 described later, and also includes various wires for the projection unit 30 and the communicator 40.

The upper housing 52 is formed from a resin and has a cylindrical shape with a substantially circular opening in the upper end except the periphery and a substantially circular opening in the lower end. The upper housing 52 has a substantially circular projection hole 55 in the side surface. The projection hole 55 has a three-dimensional shape that is gradually smaller inward from the side surface of the upper housing 52. The projection hole 55 allows passage of emission light L from the projection unit 30. The upper housing 52 has many hexagonal openings (not shown), each inscribed in a circle with a diameter of about 3 mm, in the side surface except the projection hole 55. The openings are provided for speakers 58 and microphones 59 described later.

The upper housing 52 is covered by the covering cloth 53 (speaker net). In the present embodiment, the covering cloth 53 is a polyester Saran net (registered trademark) that may be used to cover the front of a speaker. The covering cloth 53 is fixed with the upper part held between the top board 51 and the upper housing 52, and the lower part held between the upper housing 52 and a lower housing 61 described later. The covering cloth 53 around the projection hole 55 is fixed between a projection hole holder 57 and the edge of the projection hole 55. The projection hole holder 57 is a resin plate that is substantially elliptical in a plan view. The projection hole holder 57 holds an emitter 31 in the projection unit 30.

Figure 4:
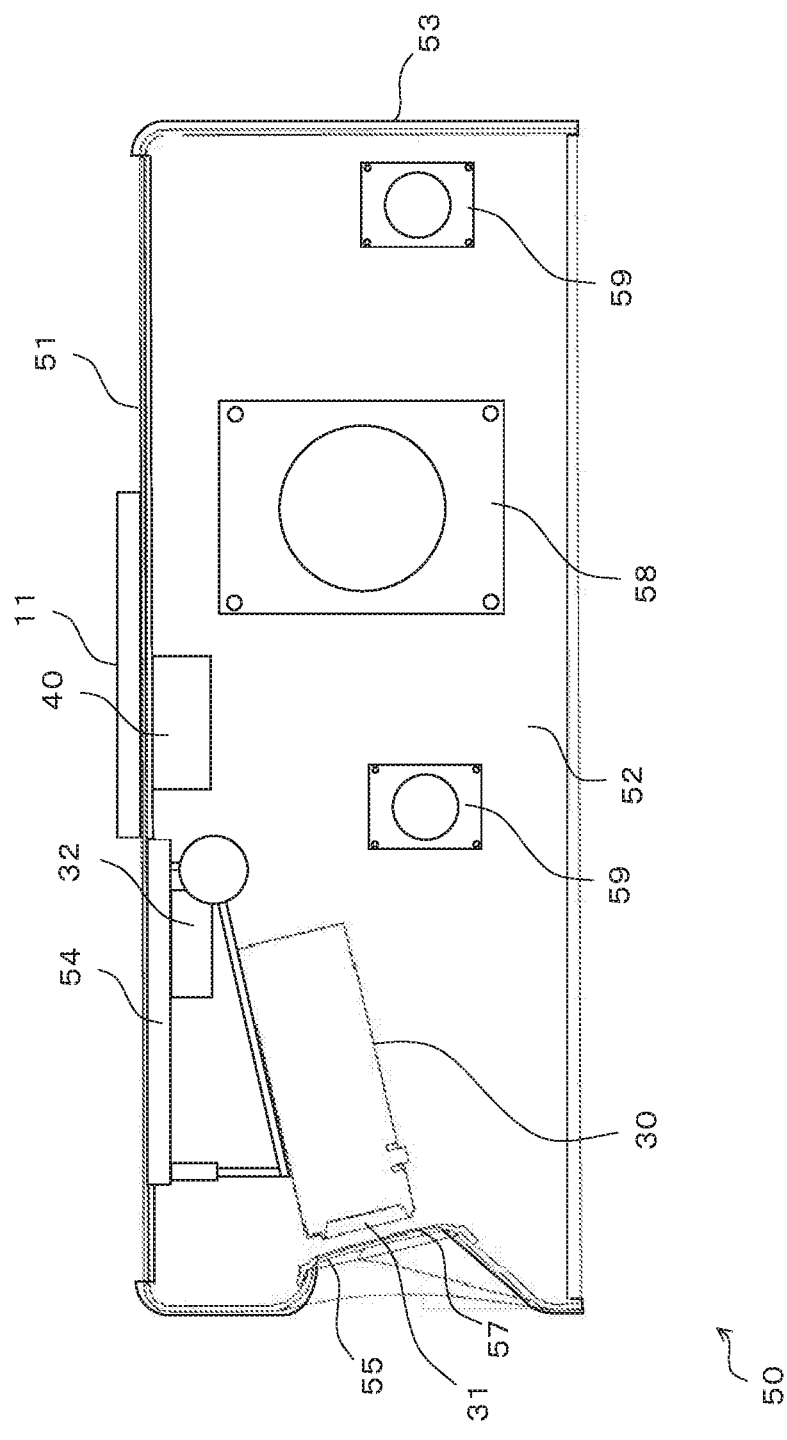
FIG. 4 is a cross-sectional side view of the upper part of the projector shown in FIG. 2.

As shown in FIG. 4, the upper housing 52 accommodates the projection unit 30, the communicator 40, the speakers 58, and the microphones 59. The projection unit 30 in the present embodiment is a digital micromirror device (DMD) manufactured by Texas Instruments (TI) Inc. The projection unit 30 includes the emitter 31 that emits emission light L representing a picture P. The emission light L passes through the projection hole 55 and is projected on a wall surface W of the room R to display the picture P. The projection unit 30 includes the driver 32 that controls the projection direction of the emitter 31.

The communicator 40 wirelessly communicates with the remote control 100 to receive picture data D from the remote control 100. The communicator 40 transmits the received picture data D1 to the projection unit 30. The projection unit 30 emits the emission light L representing the picture P based on the picture data D1.

The speakers 58 produce sound obtained by converting audio data D2 included in the picture data D1 received by the communicator 40. In the present embodiment, the upper housing 52 accommodates two speakers 58 arranged along the inner side surface.

In the present embodiment, the upper housing 52 accommodates six microphones 59 arranged along the inner side surface.

Structure of Lower Part 60

Figure 5:
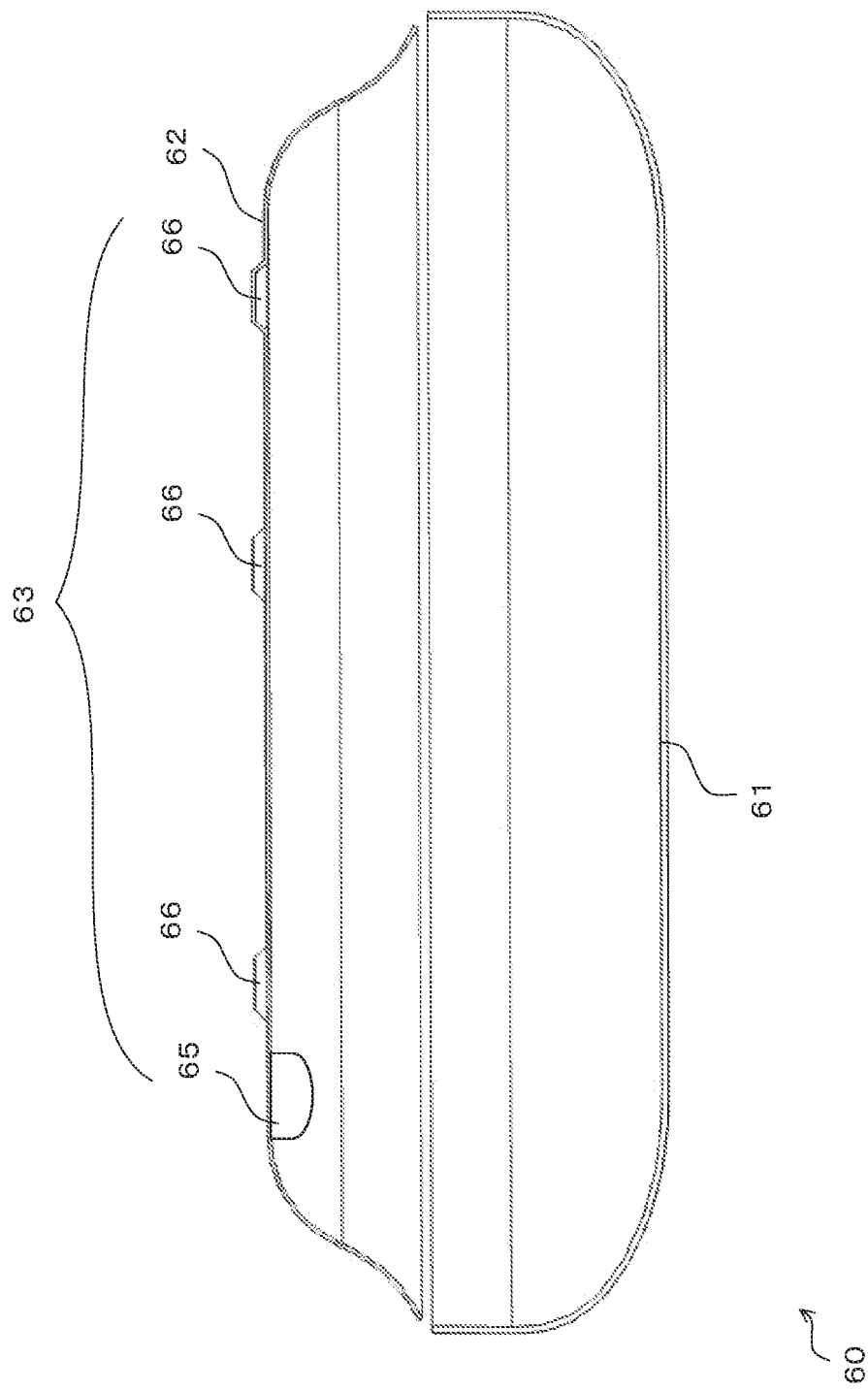
FIG. 5 is a cross-sectional side view of a lower part of the projector shown in FIG. 2.

As shown in FIG. 5, the lower part 60 includes the lower housing 61, an illuminant mounting plate 62, and illuminants 63. The lower housing 61 is formed from light-transmissive milk-white resin and is substantially bowl-shaped. The lower housing 61 has a fitting portion 64 formed along the entire periphery of the upper end and substantially L-shaped in cross section. The fitting portion (not shown) of the lower housing 61 receives the lower end of the upper housing 52 to form the housing 20.

The illuminant mounting plate 62 is a metal plate that is substantially circular in a plan view and substantially inverted-dish-shaped in cross section. The periphery of the illuminant mounting plate 62 is fitted into the fitting portion of the lower housing 61 from above. The illuminant mounting plate 62 has the illuminants 63 arranged on the lower surface. The illuminants 63 include a picture illuminator (illuminator) 65 and ordinary illuminators 66. The picture illuminator 65 is arranged nearly immediately below the projection unit 30. The picture illuminator 65 is oriented toward the wall surface W in front to illuminate the boundary between the picture P and the wall surface VV. The illumination light L1 emitted from the picture illuminator 65 is controlled by a corrector 110 described later. To illuminate the entire room R, the ordinary illuminators 66 are arranged in a substantial circle in a plan view on the lower surface of the illuminant mounting plate 62. The ordinary illuminators 66 include an LED panel.

Structure of Remote Control 100

Figure 6:
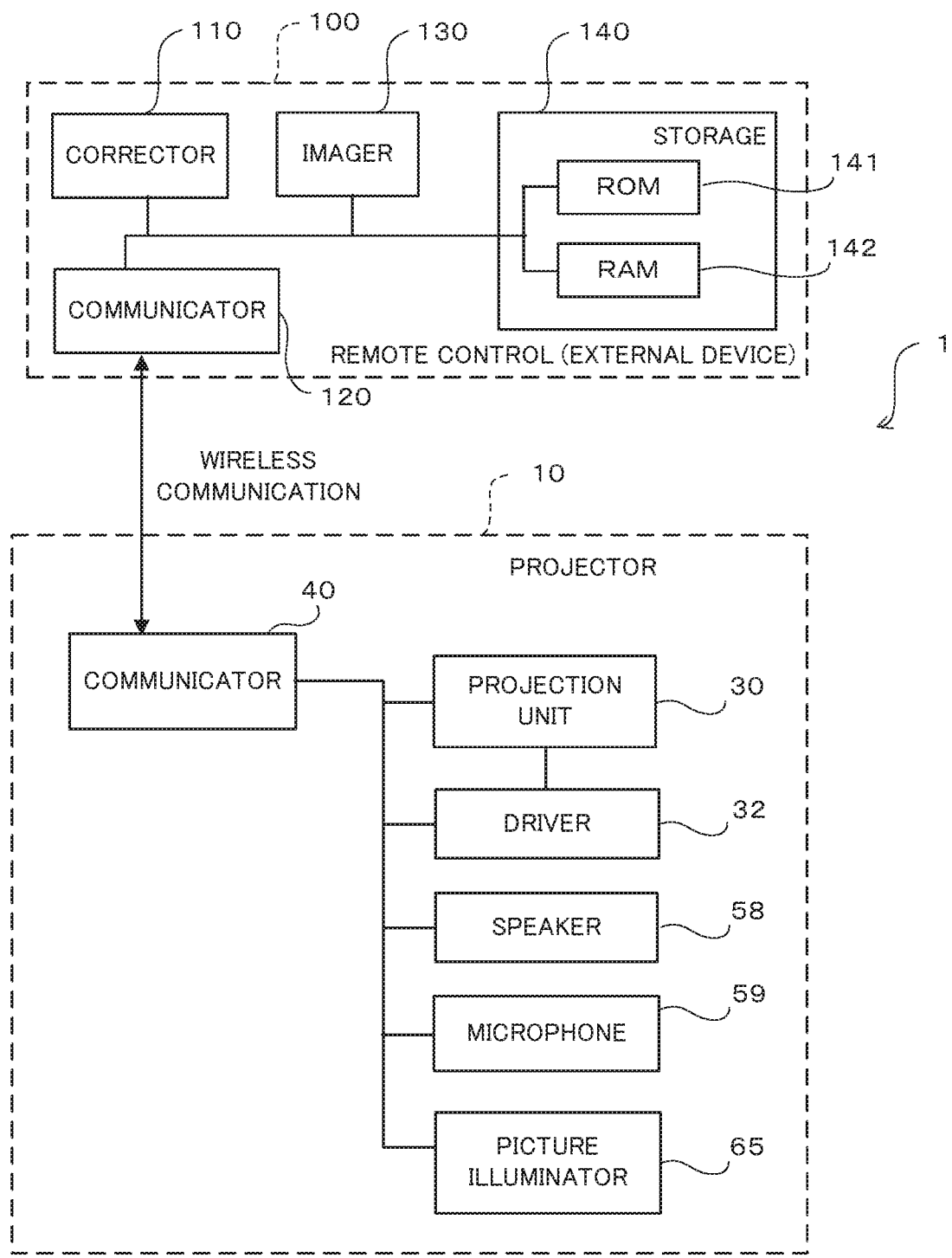
FIG. 6 is a block diagram of the projector system according to the embodiment of the present disclosure.

As shown in FIG. 6, the remote control 100 for the projector includes the corrector 110, a communicator 120, an imager 130, and a storage 140. In the present embodiment, the remote control 100 is a smartphone.

The corrector 110 is implemented by a central processing unit (CPU) in the remote control 100 executing an application downloaded from a predetermined website. The corrector 110 controls the emission light L from the projection unit 30 and the illumination light L1 from the picture illuminator 65. The control will be described later. The corrector 110 also uses information received from the imager 130 to perform a correction information generation process for generating a correction filter F that balances the luminance, hue, brightness, and saturation of the entire picture P. The corrector 110 stores the generated correction filter F and other data into the storage 140.

The communicator 120 wirelessly communicates with the communicator 40 in the projector 10 to transmit the picture data D to the projector 10. The picture data D is stored in the storage 140 described later, or may be downloaded or obtained by streaming from, for example, an external website, using the communicator 120. The communicator 120 also transmits correction information CR to the projection unit 30 through the communicator 40 in the projector 10.

The imager 130 includes a camera. The imager 130 uses the camera to capture the picture P projected onto the wall surface W. The imager 130 transmits the captured information to the corrector 110.

The storage 140 includes a read only memory (ROM) 141 and a random access memory (RAM) 142. The ROM 141 stores various fixed data items such as operation programs executable by the CPU. For example, operation programs for causing the CPU to execute the correction information generation process for generating the correction information CR based on the captured information may be stored. The ROM 141 also stores initial picture information PD including initial values such as the size, luminance, and hue of an initial displayed picture described later.

The RAM 142 serves as a work area for the CPU. The RAM 142 also stores the correction filter F and images G1 to G3.

Correction Information Generation Process

Figure 7:
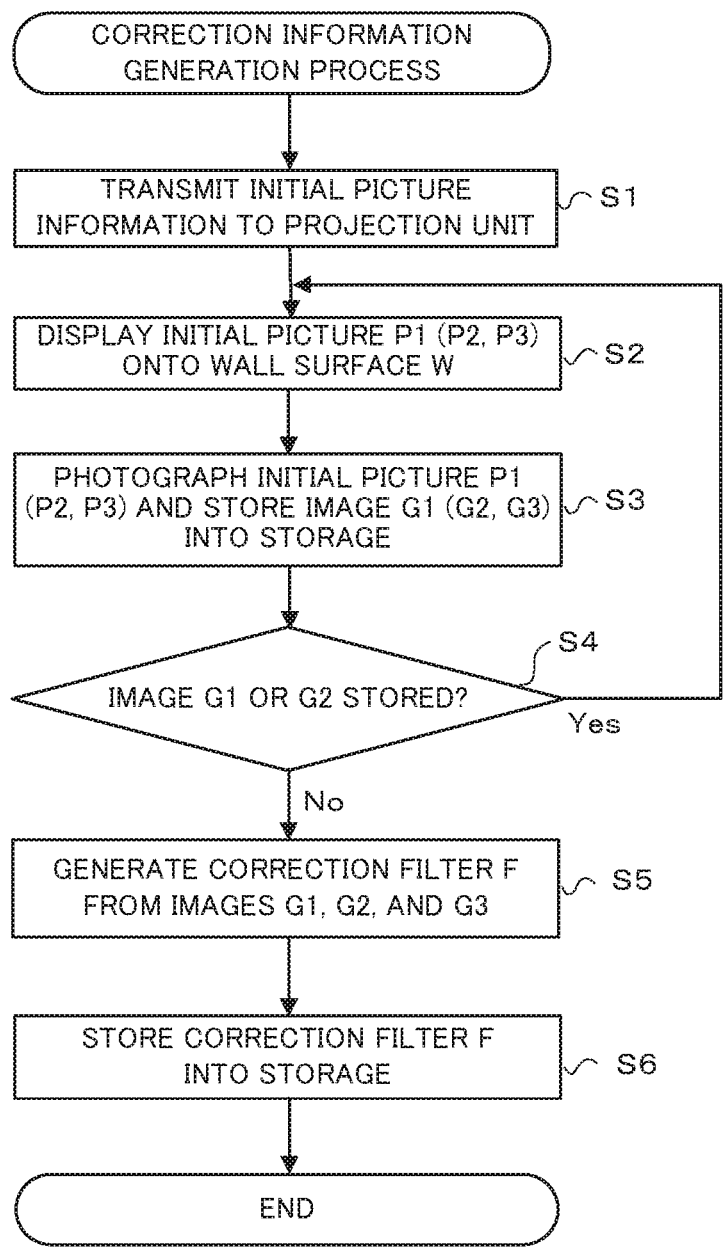

The correction information generation process performed by the projector system 1 will now be described. The correction information generation process is performed at the startup of the projector 10 included in the projector system 1. The process will be described with reference to the flowchart shown in FIG. 7.

Upon startup of the projector 10, the corrector 110 transmits the initial picture information PD to the projection unit 30 through the communicators 120 and 40 (step S1).

Based on the initial picture information PD, the projection unit 30 projects the emission light L onto the wall surface W of the room R to display an initial picture P1 (step S2). The initial picture P1 is entirely colored red with a predetermined luminance, hue, brightness, and saturation. Similarly, an initial picture P2 described later is entirely colored green with a predetermined luminance, hue, brightness, and saturation, and an initial picture P3 is entirely colored blue with a predetermined luminance, hue, brightness, and saturation.

The user photographs the initial picture P1 projected on the wall surface VV with the imager 130. The user stores the obtained image G1 of the initial picture P1 into the storage 140 (step S3).

After the image G1 is stored (Yes in step S4), the processing returns to step S2. The projection unit 30 then projects the emission light L onto the wall surface W of the room R to display the initial picture P2 based on the initial picture information PD. The user photographs the initial picture P2 projected on the wall surface W with the imager 130. The user stores the obtained image G2 of the initial picture P2 into the storage 140 (step S3).

After the image G2 is stored (Yes in step S4), the processing returns to step S2. The projection unit 30 then projects the emission light L onto the wall surface W of the room R to display the initial picture P3 based on the initial picture information PD. The user photographs the initial picture P3 projected on the wall surface W with the imager 130. The user stores the obtained image G3 of the initial picture P3 into the storage 140 (step S3).

After the image G3 is stored (No in step S4), the corrector 110 generates a correction filter F as correction information CR that balances the luminance, hue, brightness, and saturation in each of the entire images G1 to G3 stored in the storage 140 (step S5). The correspondence between a change in the luminance, hue, brightness, and saturation of the projected emission light L by a predetermined value and the resultant change in the luminance, hue, brightness, and saturation of the actual picture P projected on the wall surface W may be prestored in the storage 140, or may be obtained by projecting and photographing, for each of red, green, and blue, sets of two initial pictures with different luminance, hue, brightness, and saturation values. This information can be used to determine the correction values for luminance, hue, brightness, and saturation.

The corrector 110 stores the generated correction filter F into the storage 140 (step S6). The correction information generation process ends.

Picture Correction Process

Figure 8:
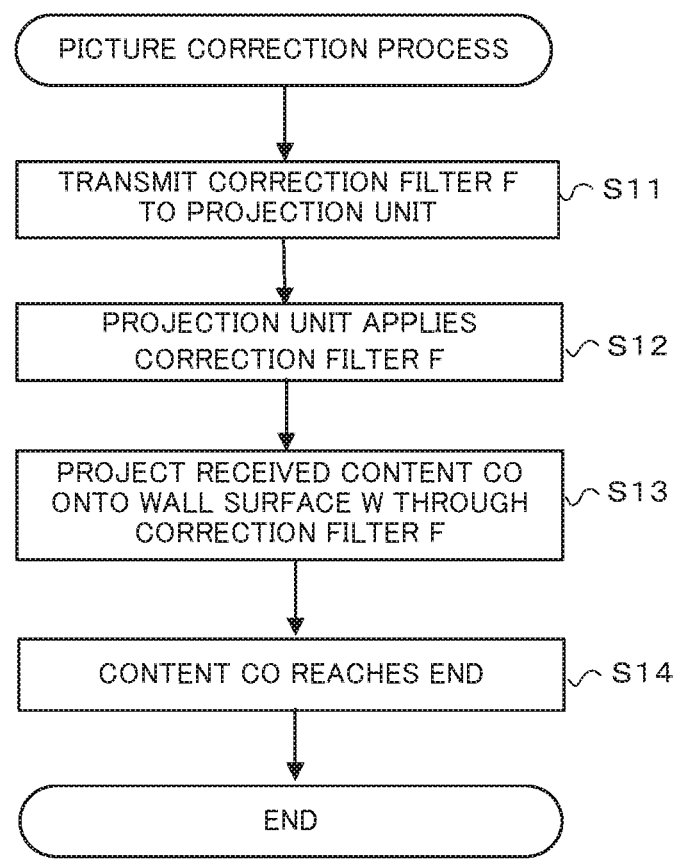
FIG. 8 is a flowchart of a picture correction process according to the present embodiment.

After the correction filter F is stored in the storage 140, the user views content using the projector system 1. The projector system 1 corrects the effect of the wall surface W on the picture P projected onto the wall surface \N. This picture correction process will now be described with reference to the flowchart shown in FIG. 8.

The corrector 110 transmits the correction filter F stored in the storage 140 to the projection unit 30 through the communicators 120 and 40 (step S11).

The projection unit 30 applies the received correction filter F (step S12).

The projection unit 30 receives content CO through the communicators 120 and 40, and projects the content CO onto the wall surface VV after picture correction through the correction filter F (step S13).

When the content CO reaches an end (step S14), the picture correction process also ends.

The correction information generation process and the picture correction process performed by the projector system 1 correct a change in a picture caused by the effect of the wall surface due to, for example, the wallpaper colors and patterns, or surface irregularity, thus allowing the corrected picture to be projected onto the wall surface W. The user can thus view the picture with a reduced effect of the wall surface. Additionally, the projector 10 in the projector system 1 is attachable to the room ceiling and can thus remain mounted at all times.

Boundary Correction Information Generation Process

Figure 9:
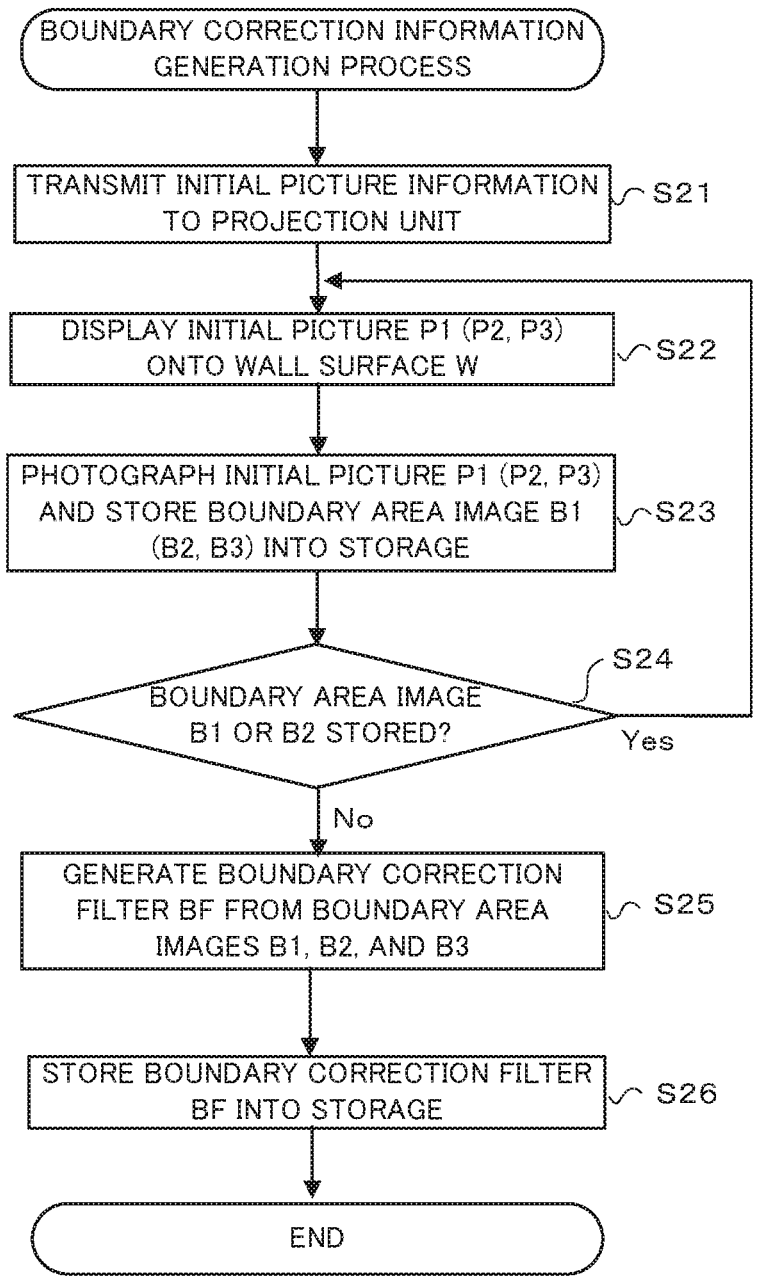
FIG. 9 is a flowchart of a boundary correction information generation process according to the present embodiment.

A boundary correction information generation process performed by the projector system 1 will now be described. The boundary correction information generation process is performed at the startup of the projector 10 included in the projector system 1 to smooth the change in the saturation in the boundary between the picture and the wall surface. The process will be described with reference to the flowchart shown in FIG. 9.

Upon startup of the projector 10, the corrector 110 transmits the initial picture information PD to the projection unit 30 through the communicators 120 and 40 (step S21).

Based on the initial picture information PD, the projection unit 30 projects the emission light L onto the wall surface W of the room R to display an initial picture P1 (step S22). The initial picture P1 is entirely colored red with a predetermined saturation. Similarly, an initial picture P2 described later is entirely colored green with a predetermined saturation, and an initial picture P3 is entirely colored blue with a predetermined saturation.

The user photographs a boundary area between the wall surface W and the initial picture P1 projected on the wall surface W with the imager 130. The user stores the obtained boundary area image B1 into the storage 140 (step S23).

After the boundary area image B1 is stored (Yes in step S24), the processing returns to step S22. The projection unit 30 then projects the emission light L onto the wall surface W of the room R to display the initial picture P2 based on the initial picture information PD. The user photographs a boundary area between the wall surface W and the initial picture P2 projected on the wall surface W with the imager 130. The user stores the obtained boundary area image B2 into the storage 140 (step S23).

After the boundary area image B2 is stored (Yes in step S24), the processing returns to step S22. The projection unit 30 then projects the emission light L onto the wall surface W of the room R to display the initial picture P3 based on the initial picture information PD. The user photographs a boundary area between the wall surface W and the initial picture P3 projected on the wall surface W with the imager 130. The user stores the obtained boundary area image B3 into the storage 140 (step S23).

After the boundary area image B3 is stored (No in step S24), the corrector 110 generates a boundary correction filter BF as boundary correction information B that corrects the change in the saturation in the boundary to a predetermined value T or less in each of the boundary area images B1 to B3 stored in the storage 140 (step S25).

The corrector 110 stores the generated boundary correction filter BF into the storage 140 (step S26). The boundary correction information generation process ends.

Boundary Correction Process

Figure 10:
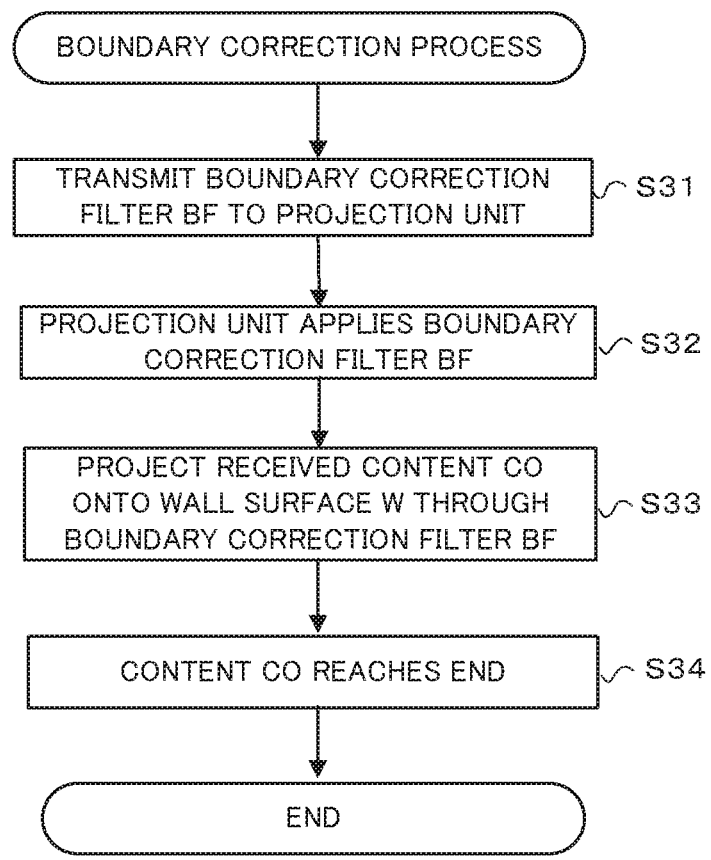
FIG. 10 is a flowchart of a boundary correction process according to the present embodiment.

After the boundary correction filter BF is stored in the storage 140, the user views content using the projector system 1. The projector system 1 corrects the change in the saturation in the boundary between the wall surface W and the picture P projected on the wall surface W to the predetermined value T or less in each image. A boundary correction process performed by the projector system 1 will now be described with reference to the flowchart shown in FIG. 10.

The corrector 110 transmits the boundary correction filter BF stored in the storage 140 to the projection unit 30 through the communicators 120 and 40 (step S31).

The projection unit 30 applies the received boundary correction filter BF (step S32).

The projection unit 30 receives content CO through the communicators 120 and 40, and projects the content CO onto the wall surface VV after boundary correction through the boundary correction filter BF (step S33).

When the content CO reaches an end, the projection unit 30 ends the projection (step S34). The boundary correction process also ends.

The boundary correction information generation process and the boundary correction process performed by the projector system 1 correct the change in the saturation in the boundary between the picture P and the wall surface W to the predetermined value T or less, thus allowing the corrected picture to be projected. The user can thus view an easily viewable picture without noticing the boundary between the wall surface and the picture.

Keystone Correction (Trapezoidal Correction) Process

Figure 11:
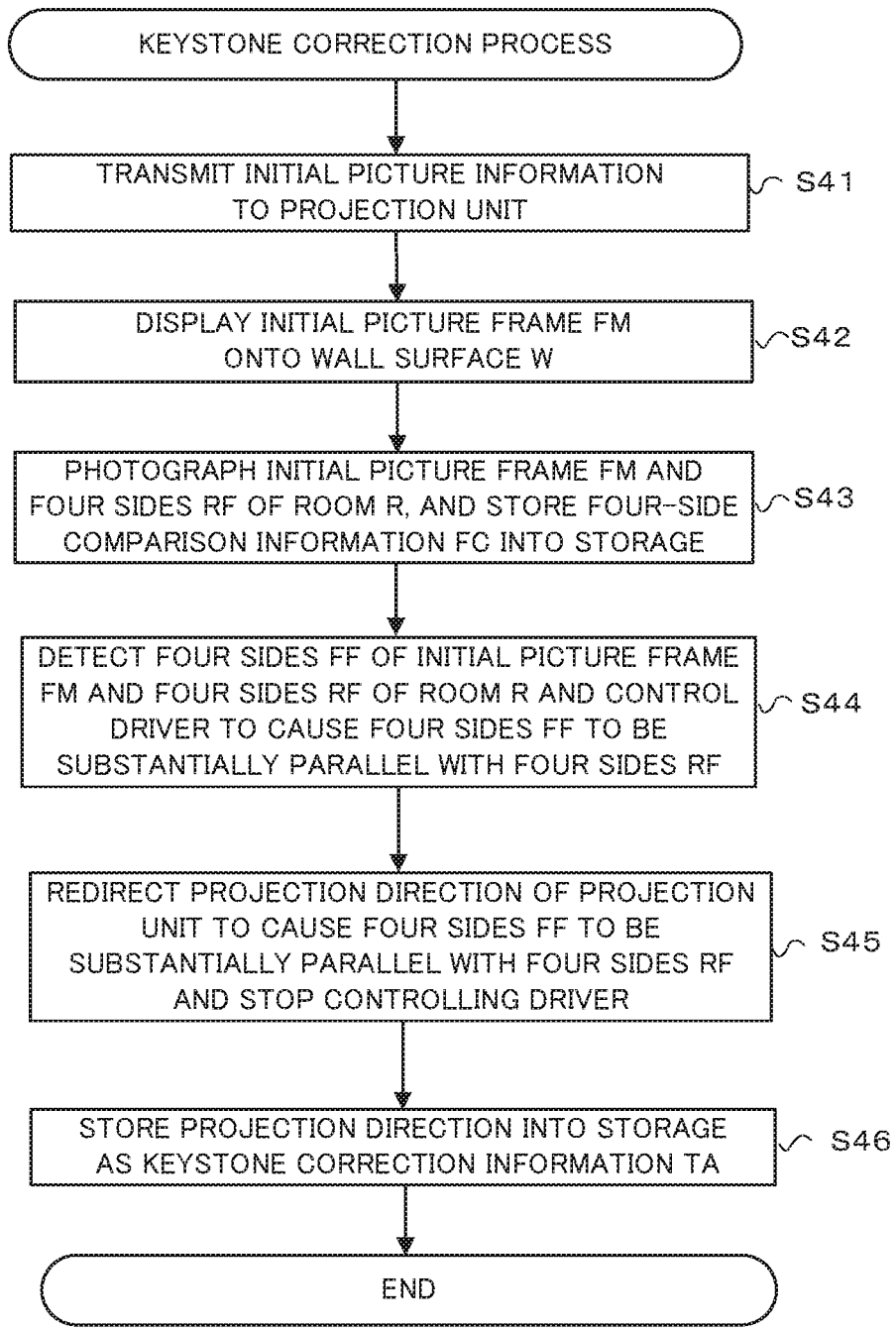
FIG. 11 is a flowchart of a keystone correction process according to the present embodiment.
Figure 12A:
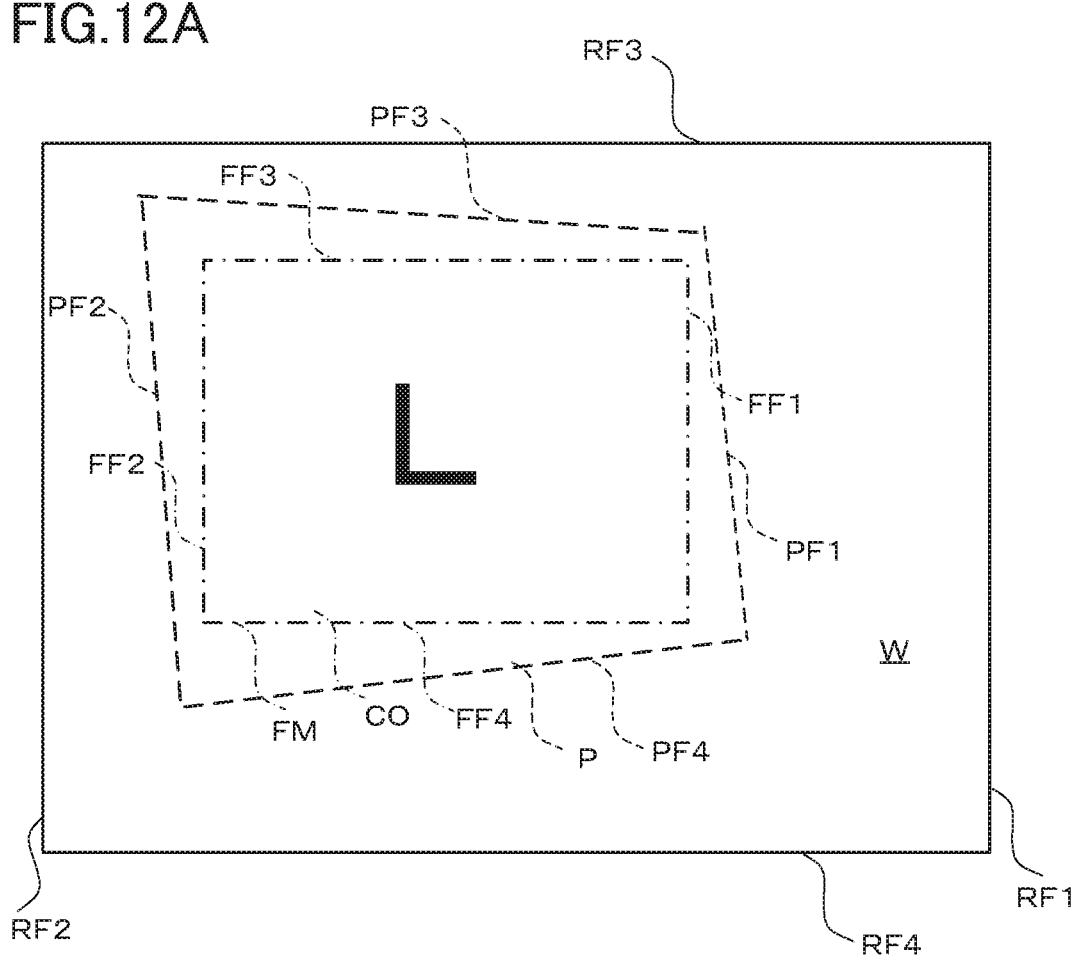
FIG. 12A is a diagram showing a picture frame and a content frame projected on a wall surface after keystone correction is performed in the present embodiment.

A keystone correction (trapezoidal correction) process performed by the projector system 1 will now be described. The keystone correction process is performed at the startup of the projector 10 included in the projector system 1. The process will be described with reference to the flowchart shown in FIG. 11. The shape of the picture P defined by four sides PF1 to PF4 may be a trapezoid or one of other various quadrilaterals instead of a rectangle depending on the mounting condition. In this case, as shown in FIG. 12A, an initial picture frame FM defined by four sides FF1 to FF4 is displayed through the keystone correction process. The picture P may be distorted under certain projector mounting conditions. For example, the ceiling rose may be decentered in the room as viewed from the projection wall, or the ceiling rose may be centered but may need oblique projection due to a window, a door, or a piece of furniture on the wall facing the ceiling rose, or may need oblique projection both horizontally and vertically toward the wall surface due to the position of the ceiling rose socket.

Upon startup of the projector 10, the corrector 110 transmits initial picture frame information PF to the projection unit 30 through the communicators 120 and 40 (step S41).

Based on the initial picture frame information PF, the projection unit 30 projects the emission light L onto the wall surface W of the room R to display the initial picture frame FM (step S42). The initial picture frame FM is a substantially rectangular frame defined by four sides FF1 to FF4 representing the outer edges of the content CO.

The user photographs, with the imager 130, four-side comparison information FC including the initial picture frame FM projected on the wall surface W and the four sides RF1 to RF4 of the room R including the ceiling surface C of the room R, the wall surface W on which the initial picture frame FM appears, and the floor surface FL of the room R. The user stores the obtained four-side comparison information FC into the storage 140 (step S43).

The corrector 110 detects the four sides FF1 to FF4 of the initial picture frame FM and the four sides RF1 to RF4 of the room R from the four-side comparison information FC stored in the storage 140, and controls the driver 32 for keystone correction by adjusting the projection direction of the projection unit 30 and causing the four sides FF1 to FF4 of the initial picture frame FM to be substantially parallel with the four corresponding sides RF1 to RF4 of the room R (step S44).

The driver 32 may not adjust the projection unit 30 in the horizontal direction. The connector 11 and the housing 20 may be rotatable, and the housing 20 may be rotated to adjust the projection unit 30 in the horizontal direction.

Figure 12B:
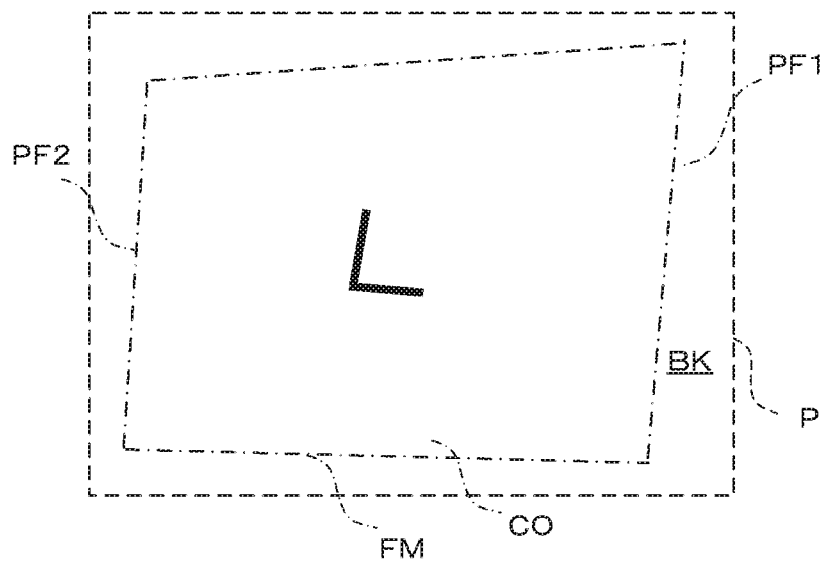
FIG. 12B is a diagram showing emission light from an emitter in FIG. 12A.

For the picture P being a distorted quadrilateral, the corrector 110 corrects the brightness in addition to keystone correction by brightening a picture area adjacent to the side FF2 more away from the projection unit 30, and darkening a picture area adjacent to the side FF1 nearer the projection unit 30. In this state, the emitter 31 in the projection unit 30 emits the emission light Las shown in FIG. 12B. The outer frame of the picture P and the outer frame of the content CO have a background BK between the frames in which no emission light L is emitted. Although the background BK desirably emits no emission light L, emitting no light may actually be difficult. For example, backlight may leak. In such a case, the edge may be smoothed. To smooth the edge, the corrector 110 may control and moderate the illumination light L1 from the picture illuminator 65 to have brightness only enough to show viewable content. This illumination light L1 can smooth the color change in the boundary between the picture P and the wall surface W.

After the projection direction of the projection unit 30 is adjusted to cause the four sides FF1 to FF4 of the initial picture frame FM to be substantially parallel with the four corresponding sides RF1 to RF4 of the room R, the corrector 110 stops controlling the driver 32 (step S45). The corrector 110 stores the adjusted projection direction into the storage 140 as keystone correction information TA (step S46). The keystone correction process ends.

The keystone correction process performed by the projector system 1 allows the four sides FF1 to FF4 of the initial picture frame FM to be substantially parallel with the four corresponding sides RF1 to RF4 of the room R. The resultant four sides FF1 to FF4 of the initial picture frame FM appear in a substantially rectangular shape to reduce the distortion of the picture P on the wall surface VV. The user can thus view an easily viewable picture.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The correction information generation process, the boundary correction information generation process, and the keystone correction process may be performed separately, or two or three of these processes may be performed simultaneously. The picture correction process and the boundary correction process may be performed simultaneously, or either process may be performed alone.

Instead of the user photographing the wall surface, the storage may prestore multiple items of information about the wallpaper colors and irregularity, and the user may search the prestored information for the colors and patterns and irregularity that are the same as or similar to the wallpaper colors and patterns and irregularity of the wall surface on which a picture is projected.

The initial pictures P1 to P3 may not be three separate pictures. The initial pictures may be a single initial picture P4 entirely red, green, or blue with a predetermined luminance, hue, brightness, and saturation.

Instead of capturing the images G1 to G3 of the initial pictures P1 to P3, the luminance, hue, brightness, and saturation may be adjusted while the user is capturing moving images of the initial pictures P1 to P3.

The illuminant 63 may be mounted external to the housing 20.

The imager 130 may be included in the projector 10 instead of being included in the remote control 100, or may be replaced with a camera capable of communicating with the remote control 100.

The keystone correction process may be performed by the user instead of the corrector.

The corrector 110 may be included in the projector 10 instead of being included in the remote control 100, or may be included in another separate device capable of communicating with the remote control 100.

The remote control may be a dedicated external device.

Figure 13:
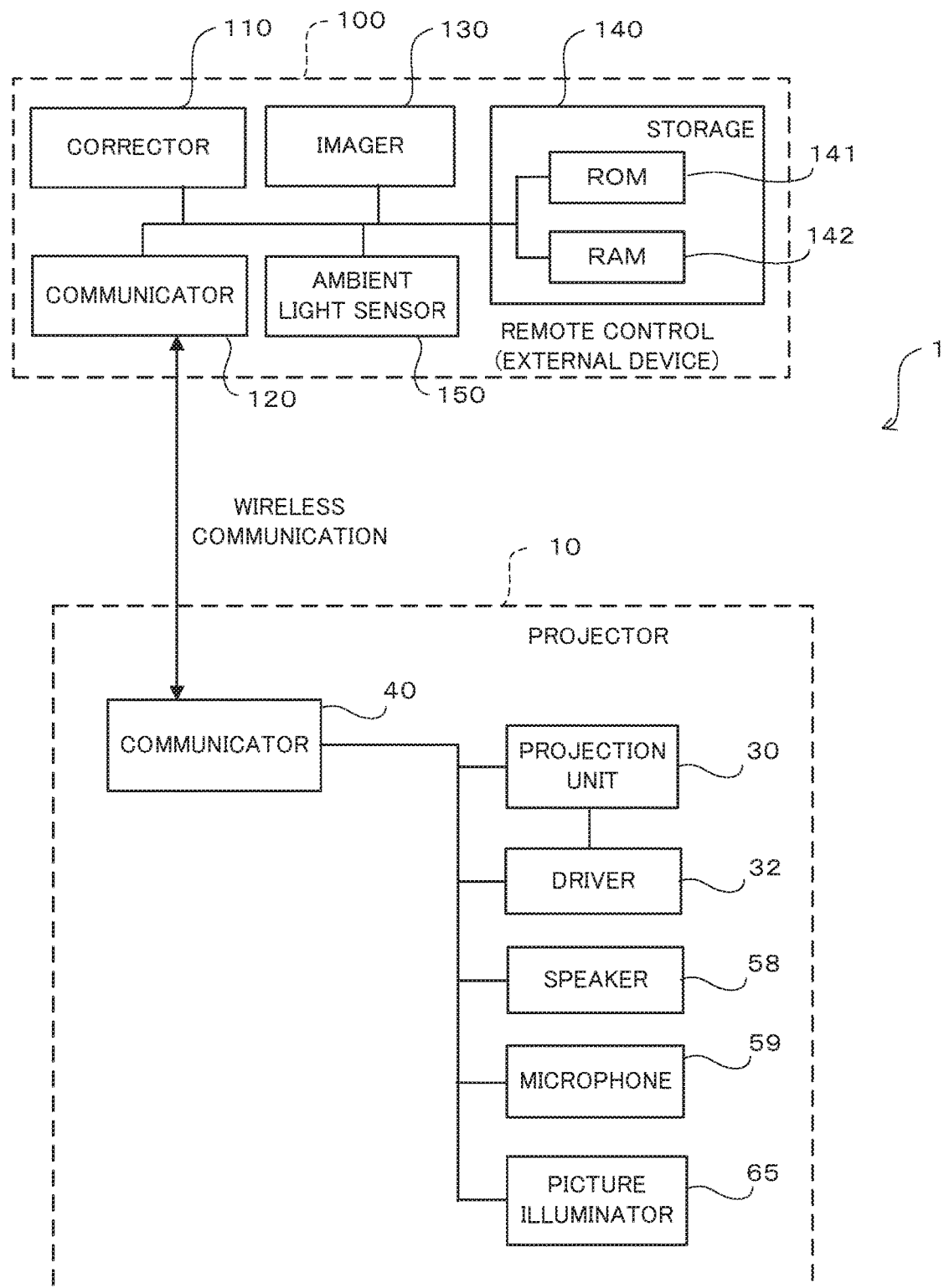
FIG. 13 is a block diagram of a projector system according to another embodiment.

As shown in FIG. 13, a remote control 100 in a projector system 1 according to another embodiment includes an ambient light sensor (brightness sensor) 150 that senses the room brightness. In some embodiments, an upper housing 52 may accommodate two ambient light sensors arranged along the inner side surface, one on the right and the other on the left of the projection unit 30. The other components are the same as in the above embodiment.

The projector system 1 including the ambient light sensor 150 performs some steps in the above embodiment to be modified as described below. The steps that are not described below are the same as described in the above embodiment.

Correction Information Generation Process 2 and Boundary Correction Information Generation Process 2

Figure 14:
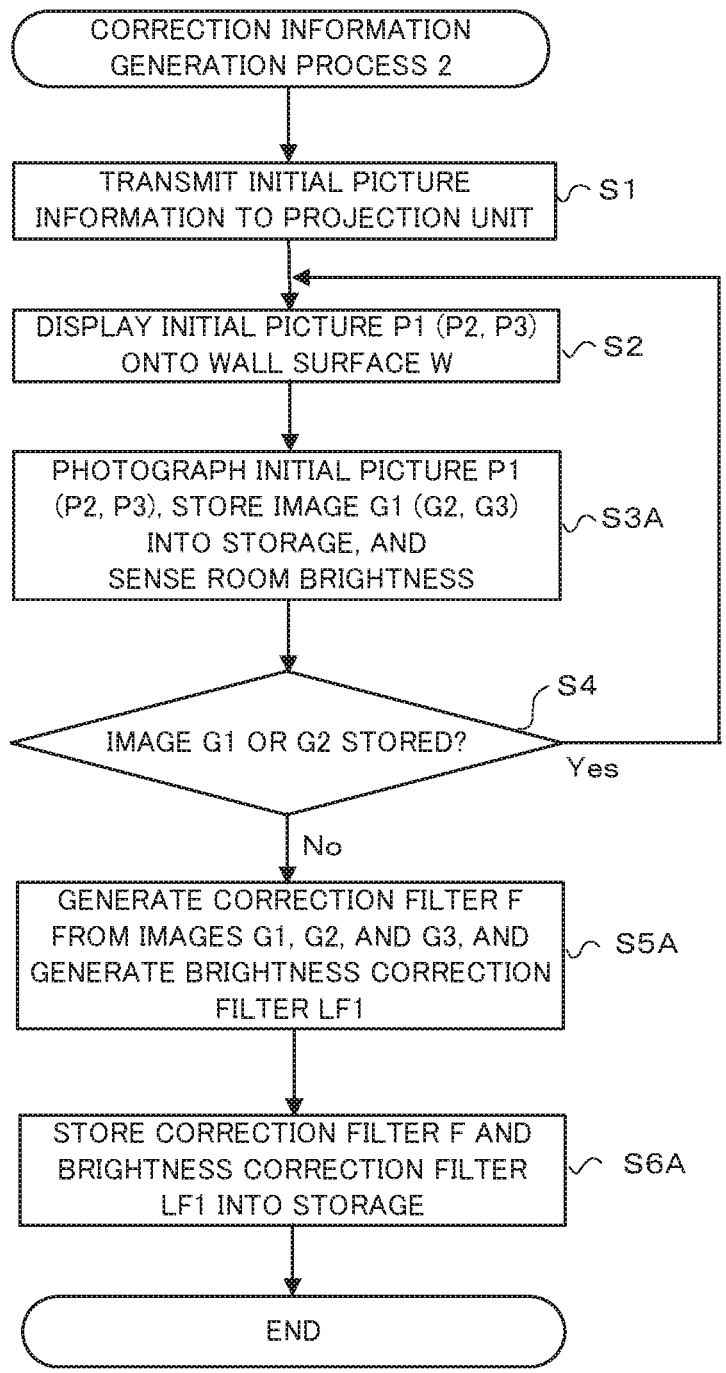
FIG. 14 is a flowchart of a correction information generation process 2 according to the other embodiment.
Figure 16:
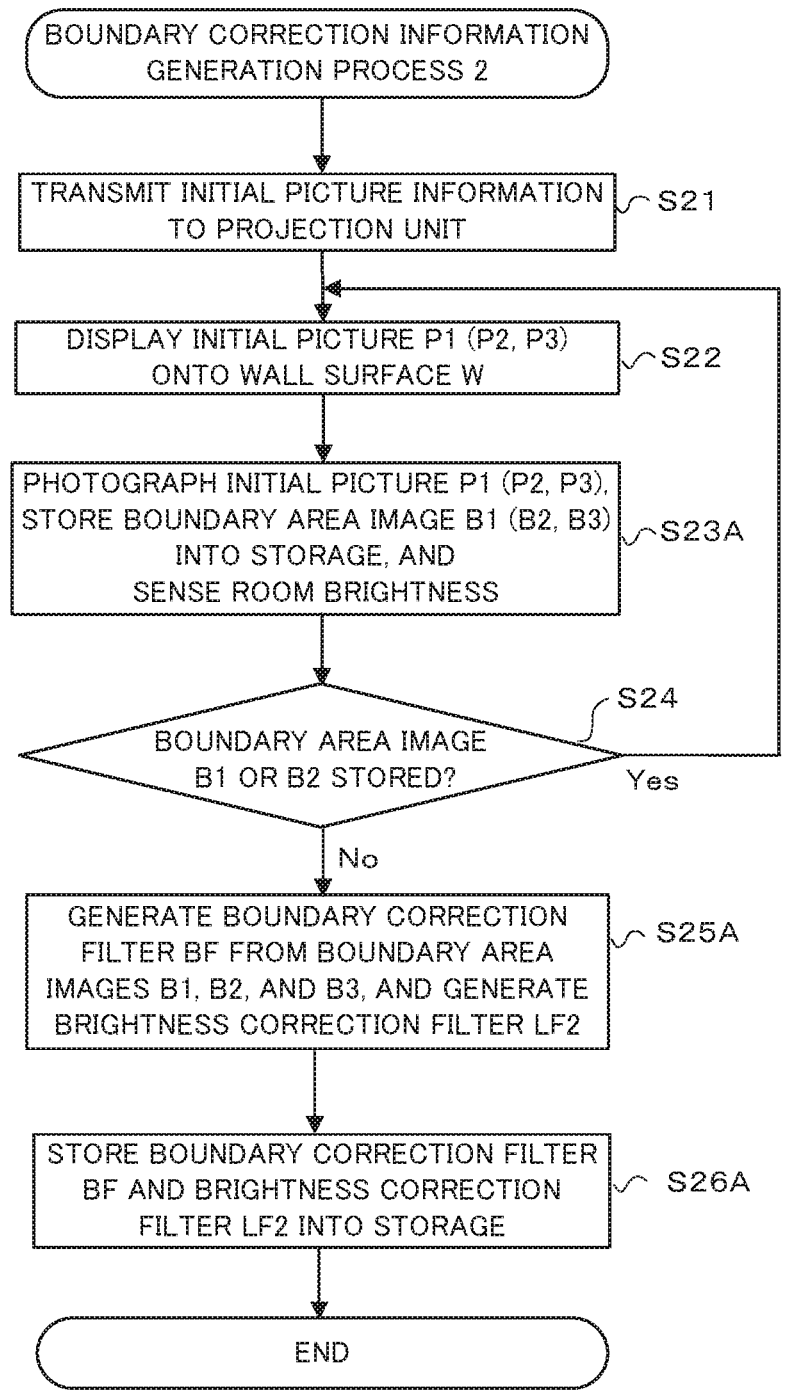
FIG. 16 is a flowchart of a boundary correction information generation process 2 according to the other embodiment.

As shown in FIGS. 14 and 16, the ambient light sensor 150 in steps S3A and S23A senses the room brightness when the initial pictures P1, P2, and P3 appear. In steps S3A and S23A, the user stores the sensed room brightness into the storage 140. The brightest room state and the darkest room state are sensed.

In steps SSA and S25A, the corrector 110 generates a brightness correction filter LF1 and a brightness correction filter LF2 for correcting the correction filter F and the boundary correction filter BF in accordance with the room brightness. The corrector 110 stores the generated filters into the storage 140 (steps S6A and S26A).

Picture Correcting Process 2 and Boundary Correction Process 2

Figure 15:
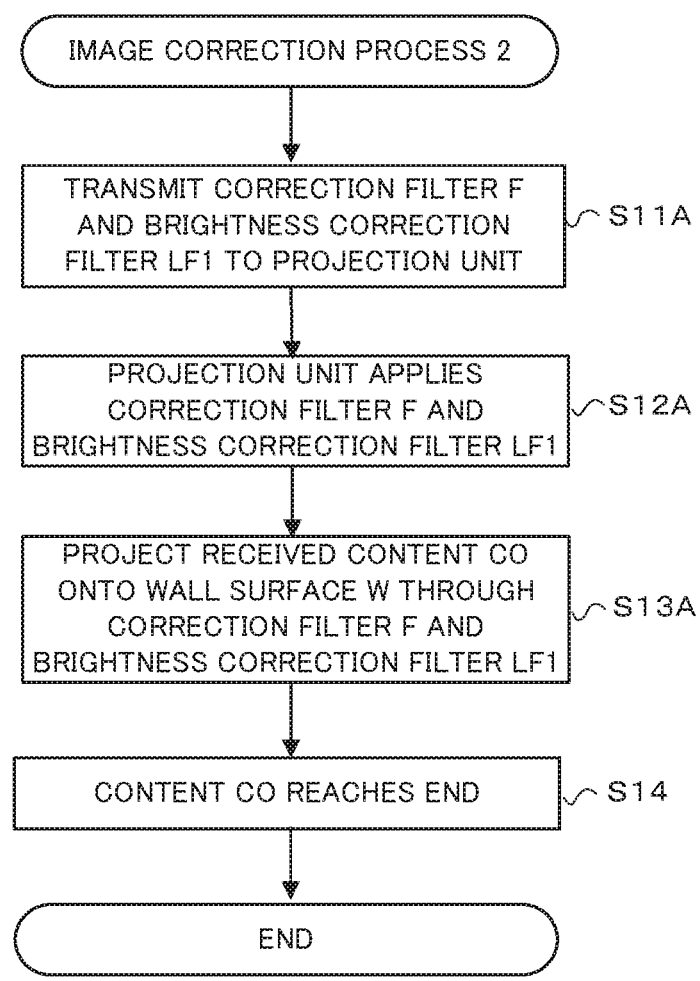
FIG. 15 is a flowchart of a picture correction process 2 according to the other embodiment.
Figure 17:
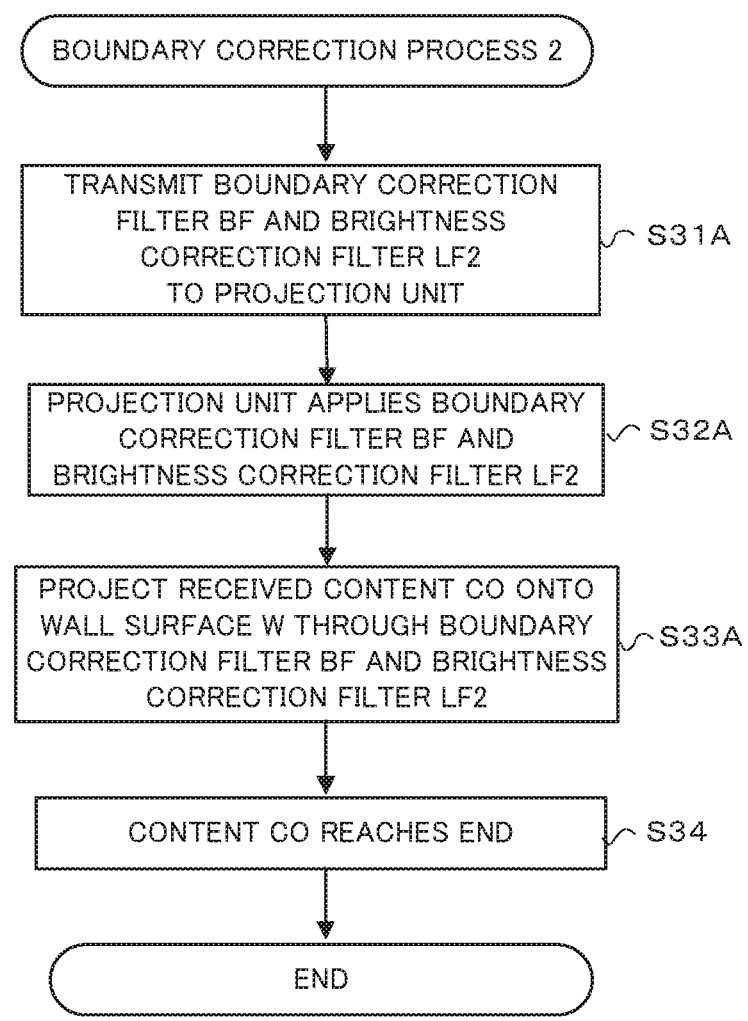
FIG. 17 is a flowchart of a boundary correction process 2 according to the other embodiment.

As shown in FIGS. 15 and 17, the corrector 110 in steps S11A and 531A transmits, to the projection unit 30 through the communicators 120 and 40, the brightness correction filters LF1 and LF2 together with the correction filter F and the boundary correction filter BF stored in the storage 140.

In steps S12A and S32A, the projection unit 30 applies the received correction filter F, boundary correction filter BF, brightness correction filter LF1, and brightness correction filter LF2. While the content CO is being projected, the ambient light sensor 150 may sense the room brightness at all times or at predetermined time intervals, and the corrector 110 may correct the brightness correction filters LF1 and LF2 in accordance with the room brightness for the content CO being projected, or generate and apply a new brightness correction filter.

The brightness correction filter LF1 is applied to correct a change in a picture caused by the effect of the wall surface due to, for example, the wallpaper colors and patterns, or surface irregularity, thus allowing the picture corrected in accordance with the room brightness to be projected onto the wall surface W. The user can thus view the picture with a reduced effect of the wall surface.

The brightness correction filter LF2 is applied to correct a change in saturation in the boundary between the picture P and the wall surface VV to a predetermined value T or less. The picture is thus corrected to have the change in the saturation in the boundary between the picture P and the wall surface W with the predetermined value T or less, and further corrected in accordance with the room brightness. The user can thus view an easily viewable picture without noticing the boundary between the wall surface and the picture in the room with any brightness.

Keystone Correction Process 2

As shown in FIG. 18, in step S44A, when the brightness of each picture area is adjusted in accordance with the distance from the projection unit 30 together with the keystone correction, the corrector 110 uses the brightness correction filter LF1 and/or the brightness correction filter LF2 generated in the correction information generation process 2 and the boundary correction information generation process 2. In some embodiments, the corrector 110 may generate a brightness correction filter LF3 in accordance with the room brightness sensed in the correction information generation process 2 and the boundary correction information generation process 2, and use the generated brightness correction filter LF3. For the illumination light L1 to be bright enough to show viewable content, the corrector 110 determines the brightness of the illumination light L1 using the four-side comparison information FC captured in step S43 and the brightness of the room R sensed by the ambient light sensor 150. In addition, the background BK shown in FIG. 12B may be set slightly brighter in an area adjacent to the content CO, and the brightness may decrease as being more away from the content CO. The brightness decrease is determined depending on the brightness of the room R, the brightness of the content CO, the distance between the projector 10 and the wall surface W, the size of the content CO, and a predetermined width WB described later.

Figure 19A:
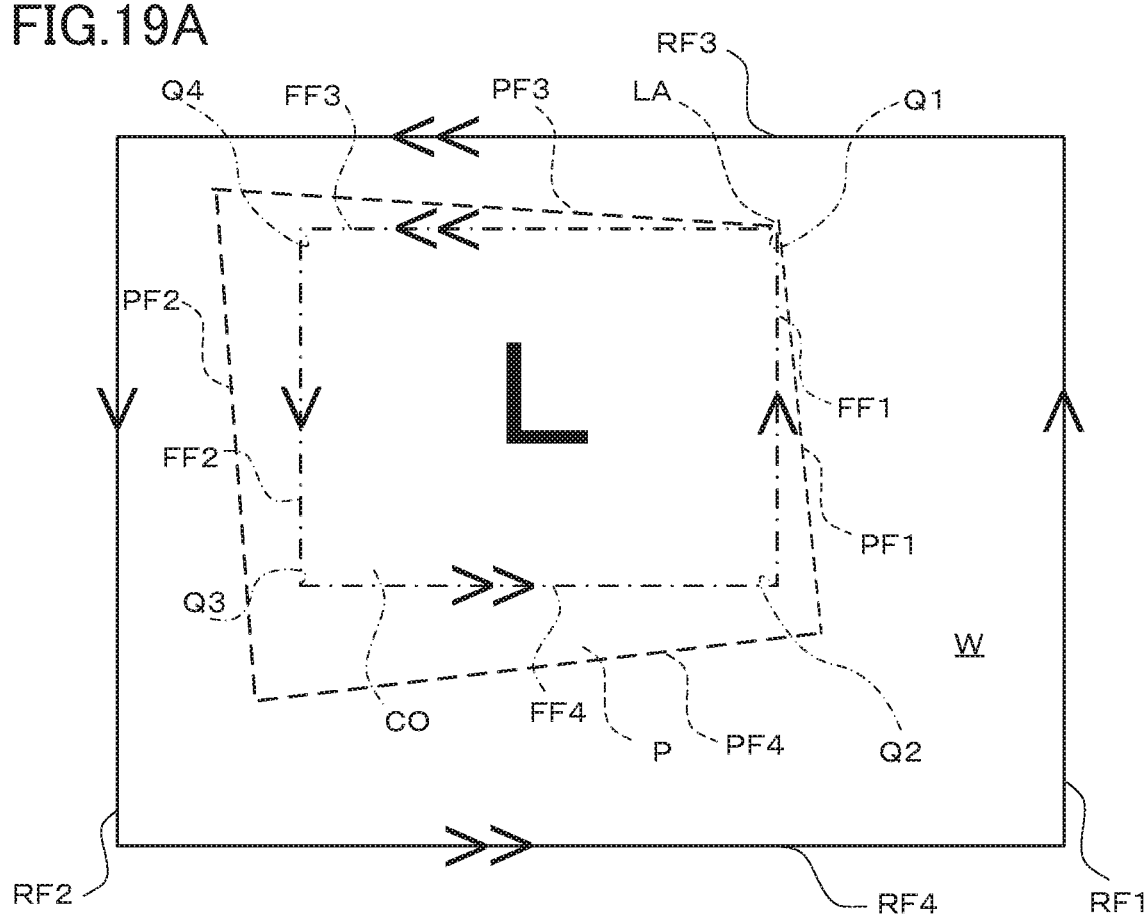
FIG. 19A is a diagram describing a content positioning method used for keystone correction according to the other embodiment.
Figure 19B:
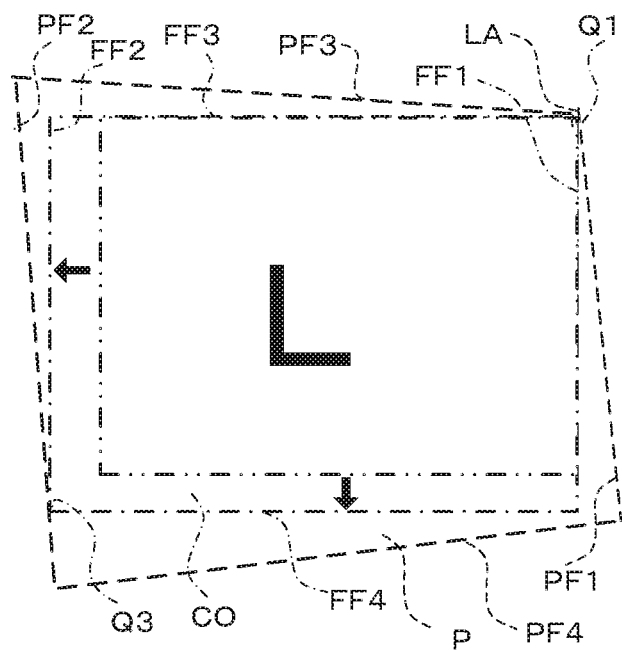
FIG. 19B is a diagram describing the content positioning method used for keystone correction according to the other embodiment.
Figure 19C:
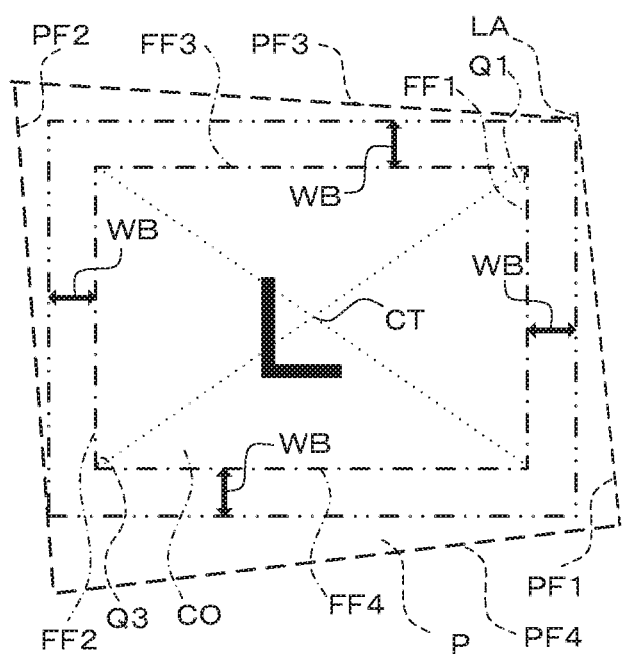
FIG. 19C is a diagram describing the content positioning method used for keystone correction according to the other embodiment.

In the keystone correction according to the present embodiment and the above embodiment, the four sides of the perimeter of the content CO in the picture P are corrected to a rectangle, unlike typical keystone correction in which the perimeter of the picture P is corrected to a rectangle. Thus, after the four sides FF1 to FF4 of the picture P are adjusted to be substantially parallel with the four corresponding sides RF1 to RF4 of the room R, the area in which the content CO is placed is to be defined in the picture P. An example method for placing the content CO will now be described. As shown in FIG. 19A, the corrector 110 in step 44A tentatively positions the corner Q1 of the content CO at the corner LA (>90°) having the largest interior angle among the four corners of the picture P. At the same time, the content CO is placed within the picture P with the four sides substantially parallel with the four corresponding sides of the room R. As shown in FIG. 19B, the corrector 110 then enlarges the content CO until one or more of the remaining corners Q2 to Q4 of the content CO comes into contact with any one of the four sides of the perimeter of the picture P (in the present embodiment, the corner Q3 comes into contact with the side PF2). As shown in FIG. 19O, the corrector 110 then reduces the content CO relative to the center CT of the content CO to form a BK area with a predetermined width WB or more around the four-side perimeter of the content CO (the picture P becomes larger by the predetermined width WB or more from the four sides of the content CO) to determine the position and size of the content CO within the picture P. The predetermined width WB may be an optimum value determined in accordance with, for example, the brightness of the room R, the brightness of the content CO, the distance between the projector 10 and the wall surface W (the picture P), and the size of the content CO, In some embodiments, the predetermined width WB may be determined as preferred by the user. Additionally, the moderate brightness enough to show viewable content described above may be optimized depending on these parameters, like the predetermined width WB. The predetermined width WB may be zero.

The brightness correction filter LF1 (or LF2 or LF3) is applied to smooth the edge in accordance with the brightness of the room R, thus further smoothing the color change in the boundary between the picture P and the wall surface W.

The corrector 110 may use the brightness correction filter LF1, the brightness correction filter LF2, and the brightness correction filter LF3 not only for the projection unit 30 but also for the picture illuminator 65 to change the illumination light L1. The corrector 110 can thus correct a greater change in the brightness of the room R. In some embodiments, the brightness correction filter LF1, the brightness correction filter LF2, and the brightness correction filter LF3 may be used for the picture illuminator 65, instead of the projection unit 30.

Instead of using the brightness correction filter LF1, the brightness correction filter LF2, and the brightness correction filter LF3, for example, automatic brightness adjustment may be prepared for the illumination light L1 to determine the appropriate brightness when the projector system 1 is mounted. In example automatic adjustment, the picture illuminator 65 emits the illumination light L1 with the brightness obtained by multiplying the average brightness of the content CO by a predetermined coefficient Z (the predetermined coefficient Z may be determined as appropriate by the user or predetermined at the factory shipment). When the content CO is replayed, the brightness of the illumination light L1 may be determined by multiplying the average brightness of the content CO calculated within the latest predetermined time period D by the predetermined coefficient Z.

In the above embodiment, although the corrector 110 in steps S3A and S23A causes the ambient light sensor 150 to sense a bright state of the room R and a dark state of the room R, the ambient light sensor 150 may sense, for example, the brightness of the room R at each of the brightness levels controllable by the picture illuminator 65. This improves the accuracy of the brightness correction filters LF1 and LF2.

In the above embodiment, although the correction filter F and the brightness correction filter LF1 are used to reduce the effect of the wall surface, the imager 130 may capture a picture projected though the correction filter F in a bright state of the room R and a picture projected through the correction filter F in a dark state of the room R, thus generating a correction filter capable of correction in accordance with the brightness of the room R. The generated correction filter may be applied to reduce the effect of the wall surface.

In the above embodiment, although the boundary correction filter BF and the brightness correction filter LF2 are used to smooth the color change, the imager 130 may capture a picture projected through the boundary correction filter BF in a bright state of the room R and a picture projected through the boundary correction filter BF in a dark state of the room R, thus generating a boundary correction filter capable of boundary correction in accordance with the brightness of the room R. The generated boundary correction filter may be applied to smooth the color change.

Although each of the brightness correction filter LF1, the brightness correction filter LF2, and the brightness correction filter LF3 is used for the corresponding process in the above embodiment, a brightness correction filter LF4 commonly used in the processes may be generated and applied.

The projection unit 30 may project different pieces of content in two or more areas at the same time. For example, the projection unit 30 may be used as a clock as well as a foot light in a bedroom at night by displaying the time on a wall surface and lighting a lower part of the wall surface of the passage to the outside of the room (the brightness may be greater as being nearer the room entrance, or an arrow may be displayed to indicate the room entrance).

This application is based on International Patent Application No. PCT/JP2017/034343 filed on Sep. 17, 2017, the entire description, claims, and drawings of which are incorporated herein by reference.

REFERENCE SIGNS LIST

1 Projector system
10 Projector
11 Connector
20 Housing
30 Projector
40 Communicator
50 Upper part
51 Top board
52 Upper housing
53 Covering cloth
55 Projection hole
58 Speaker
59 Microphone
60 Lower part
61 Lower housing
62 Illuminant mounting plate
63 Illuminant
65 Picture illuminator (illuminator)
66 Ordinary illuminator
100 Remote control (external device)
110 Corrector
120 Communicator
130 Imager
140 Storage
150 Ambient light sensor (brightness sensor
C Ceiling surface
CO Content
FL Floor surface
L Emission light
P Picture
W Wall surface

The invention claimed is:

1. A projector system, comprising:
   a connector attachable to a lighting wiring base mounted on a ceiling surface of a room;
   a housing hanging from the connector;
   a communicator accommodated in the housing to obtain content to be projected onto a wall surface of the room;
   a projection unit accommodated in the housing to emit emission light to project a picture including the content onto the wall surface;
   a brightness sensor to sense a brightness of the room;
   a corrector to control the emission light to correct an effect of a state of the wall surface on the projected picture in accordance with the brightness of the room;
   an illuminator arranged in the housing or mounted external to the housing; and
   an imager to photograph the wall surface,
   wherein
   the corrector controls illumination light from the illuminator to smooth a color change in a boundary between the picture and the wall surface,
   the corrector corrects the effect of the state of the wall surface on the projected picture based on the state of the wall surface obtained by photographing, and
   the imager photographs four sides of the content projected on the wall surface, and four sides of the room including the ceiling surface, the wall surface, and a floor surface of the room, and the corrector performs, based on a state of the content obtained by photographing, keystone correction to cause the four sides of the content to be substantially parallel with the four corresponding sides of the room including the ceiling surface, the wall surface, and the floor surface of the room.

2. The projector system according to claim 1, wherein
   the corrector causes the imager to photograph or the brightness sensor to sense when the picture is projected in a bright state of the room and in a dark state of the room, and controls the illumination light depending on a result of the brightness sensor sensing a current brightness of the room to smooth the color change in the boundary between the picture and the wall surface.

3. The projector system according to claim 2, wherein
   the picture is larger by at least a predetermined width from a perimeter of the content, and
   the corrector corrects a portion of the picture with the predetermined width to have a lower brightness as being more away from the content.

4. The projector system according to claim 1, wherein
   the corrector controls the illumination light in accordance with an average brightness of the picture for a predetermined time period.

5. The projector system according to claim 4, wherein
   the picture is larger by at least a predetermined width from a perimeter of the content, and
   the corrector corrects a portion of the picture with the predetermined width to have a lower brightness as being more away from the content.

6. The projector system according to claim 1, wherein
   the corrector controls the illumination light in accordance with the brightness of the room.

7. The projector system according to claim 6, wherein
   the picture is larger by at least a predetermined width from a perimeter of the content, and
   the corrector corrects a portion of the picture with the predetermined width to have a lower brightness as being more away from the content.

8. The projector system according to claim 1, wherein
   the imager and the brightness sensor are mounted on an external device, and
   the external device is a remote control to receive an input for switching the content to be displayed and control the switching.

9. The projector system according to claim 8, wherein
   the picture is larger by at least a predetermined width from a perimeter of the content, and
   the corrector corrects a portion of the picture with the predetermined width to have a lower brightness as being more away from the content.

10. The projector system according to claim 1, wherein
the picture is larger by at least a predetermined width from a perimeter of the content, and
the corrector corrects a portion of the picture with the predetermined width to have a lower brightness as being more away from the content.

11. A projector, comprising:
a connector attachable to a lighting wiring base mounted on a ceiling surface of a room;
a housing hanging from the connector;
a communicator accommodated in the housing to obtain content to be projected onto a wall surface of the room;
a projection unit accommodated in the housing to emit emission light to project a picture including the content onto the wall surface;
a brightness sensor to sense a brightness of the room;
an illuminator mounted external to the housing and separated from the projection unit; and
an imager to photograph the wall surface,
wherein
the communicator communicates with an external device including a corrector and causes the corrector to control the emission light and correct an effect of a state of the wall surface on the projected picture in accordance with the brightness of the room,
illumination light from the illuminator is controlled by the corrector to smooth a color change in a boundary between the picture and the wall surface,
the effect of the state of the wall surface on the projected picture is corrected by the corrector based on the state of the wall surface obtained by photographing, and
the imager photographs four sides of the content projected on the wall surface, and four sides of the room including the ceiling surface, the wall surface, and a floor surface of the room, and based on a state of the content obtained by photographing, keystone correction is performed by the corrector to cause the four sides of the content to be substantially parallel with the four corresponding sides of the room including the ceiling surface, the wall surface, and the floor surface of the room.

12. The projector according to claim 11, wherein
the corrector causes the imager to photograph or the brightness sensor to sense when the picture is projected in a bright state of the room and in a dark state of the room, and controls the illumination light depending on a result of the brightness sensor sensing a current brightness of the room to smooth the color change in the boundary between the picture and the wall surface.

13. The projector according to claim 11, wherein
the corrector smooths the color change in the boundary between the picture and the wall surface by correcting a change in saturation in the boundary between the picture and the wall surface to a predetermined value or less.

14. The projector according to claim 11, wherein
the corrector smooths the color change in the boundary between the picture and the wall surface by having brightness sufficient to view content and smoothing an edge.

15. The projector according to claim 11, wherein
the picture is larger by at least a predetermined width from a perimeter of the content, and
the corrector corrects a portion of the picture with the predetermined width to have a lower brightness as being more away from the content.

* * * * *